US008922632B2

United States Patent
Chen et al.

(10) Patent No.: US 8,922,632 B2
(45) Date of Patent: Dec. 30, 2014

(54) GUIDE SYSTEM HAVING FUNCTION OF REAL-TIME VOICE RESPONSE FOR THE VISUALLY IMPAIRED AND METHOD THEREOF

(75) Inventors: Yen-Lin Chen, Taipei (TW); Chao-Wei Yu, Pingtung County (TW); Chuan-Yen Chiang, Nantou County (TW)

(73) Assignee: National Taipei University of Technology, Taipei (TW)

( * ) Notice: Subject to any disclaimer, the term of this patent is extended or adjusted under 35 U.S.C. 154(b) by 383 days.

(21) Appl. No.: 13/567,771

(22) Filed: Aug. 6, 2012

(65) Prior Publication Data

US 2013/0222561 A1 Aug. 29, 2013

(30) Foreign Application Priority Data

Feb. 3, 2012 (TW) .............................. 101103602 A

(51) Int. Cl.
*H04N 7/18* (2006.01)
(52) U.S. Cl.
USPC .......................................................... 348/62
(58) Field of Classification Search
USPC ............................... 348/62, 61; 434/112, 116
IPC ...................................................... H04N 7/18
See application file for complete search history.

(56) References Cited

U.S. PATENT DOCUMENTS

2011/0216179 A1* 9/2011 Dialameh et al. ............... 348/62

FOREIGN PATENT DOCUMENTS

TW M346877 U 12/2008
TW M419956 U1 1/2012

OTHER PUBLICATIONS

Office Action dated Dec. 25, 2013 in Taiwanese Application No. 10-1103602.

* cited by examiner

*Primary Examiner* — Sherrie Hsia
(74) *Attorney, Agent, or Firm* — Saliwanchik, Lloyd & Eisenschenk

(57) ABSTRACT

The present invention is directed to a guide system having a function of a real-time voice response for the visually impaired and a method thereof. The guide system responds road conditions in real time using two processing modules performing image processing and voice responses, respectively. The guide system includes an visual sensing module sensing an image, a memory storing multiple training samples and multiple pieces of audio response information, an image processing module performing an image detection process to the image so as to create at least a segmented image, performing an object detection process to the segmented image, and performing an object recognition process so as to create a recognition signal, a system processing module creating an audio signal based on the recognition signal such that a speech voice is hearable by a user.

14 Claims, 7 Drawing Sheets

GUIDE SYSTEM HAVING FUNCTION OF REAL-TIME VOICE RESPONSE FOR THE VISUALLY IMPAIRED AND METHOD THEREOF

CROSS-REFERENCE TO RELATED APPLICATION

This application claims the benefit of Taiwan Patent Application No. 101103602, filed Feb. 3, 2012, which is hereby incorporated by reference in its entirety.

BACKGROUND OF THE INVENTION

1. Field of the Disclosure

The invention relates to a guide system having a function of a real-time voice response for the visually impaired and a method thereof, and more particularly, to a guide system having a function of a real-time voice response for the visually impaired using an visual sensing module as well as a multi-core processor and a method thereof.

2. Brief Description of the Related Art

Recently, with technology improvement and high socialization development, public welfare is more and more emphasized. It is a more and more critical issue that the disabled has a convenient environment. For example, with regards to the visually impaired, comprehensive guide devices are highly beneficial to the mobility of the visually impaired. Voice warnings can be provided at traffic lights or in elevators, or the use of pre-set landmarks combining with a voice feed back system. However, these guide devices are not complete, causing inconvenience to the visually impaired.

Current guide devices for the visually impaired have multiple shortcomings. A traditional guide stick only can detect obstacles to the close front of the visually impaired. A guide dog can interact with the visually impaired, but the cost of feeding the guide dog is relatively high and cannot be affordable to ordinary people. Other electronic guide devices, such as global positioning system accompanied by an audio module, are used to notify the visually impaired of road conditions. Other electronic guide devices are like a prebuilt land mark accompanied by a voice response system. These electronic guide devices are more convenient than ever, but have no function of real-time analysis or response to road conditions.

Accordingly, in order to improve the shortcomings of the current technology and enhance industrial availability, the present invention provides a guide system having a function of a real-time voice response for the visually impaired and a method thereof.

BRIEF SUMMARY

In order to improve the above-mentioned problems of prior art, the present invention is directed to a guide system having a function of a real-time voice response for the visually impaired and a method thereof so as to solve the problems of not notifying the user of road conditions in real time.

The present invention proposes a guide system having a function of a real-time voice response for the visually impaired. The guide system comprises an visual sensing module sensing an image containing at least an object, a memory storing multiple training samples and multiple pieces of audio response information, an image processing module performing an image detection process to the image so as to detect the object, segmenting and intercepting the detected object from the image so as to create at least a segmented image, tracking the segmented image, performing an object detection process to the segmented image so as to extract an object characteristic of the segmented image, and performing an object recognition process to the object characteristic so as to find correspondence in the training samples stored in the memory and create a recognition signal, a system processing module performing a human machine interface, receiving the recognition signal and finding correspondence in the multiple pieces of audio response information stored in the memory based on the recognition signal so as to create an audio signal, and an audio module outputting a speech voice hearable by a user based on the audio signal. Thereby, the guide system responds to road conditions in real time using the image processing module and the system processing module performing image processing and voice responses, respectively.

In one embodiment, the guide system further comprises an input module, through which the user inputs a command, such that the audio module is controlled by the system processing module.

In one embodiment, the guide system further comprises a register storing the segmented image in a $(t-1)^{th}$ intercepted frame, wherein the image processing module receives the segmented image in a $t^{th}$ intercepted frame with finding the segmented image in the $(t-1)^{th}$ intercepted frame stored in the register so as to be calculated and compared, after which the segmented image in the $t^{th}$ intercepted frame is stored in the register.

In one embodiment, a computational theory of edge detection, called Canny algorithm, and a connected-component labeling method are used to perform the image detection process and to analyze and calculate the image so as to create the segmented image.

In one embodiment, the image processing module comprises a weak classifier and a strong classifier to analyze and calculate the segmented image in the object recognition process, wherein the weak classifier analyzes and calculates a signal of the segmented image using Adaboost's algorithm so as to create a profile signal, and wherein the strong classifier performs an image analysis process to the profile signal using a histogram of oriented gradients so as to create the recognition signal.

In one embodiment, the image processing module classifies the segmented image using a support vector machine (SVM) so as to find correspondence in the training samples stored in the memory.

In one embodiment, the audio module has the audio signal digital/analog converted using an adaptive differential pulse-code modulation (ADPCM) so as to create the speech voice.

The present invention proposes a real-time voice response method for a guide system having a function of a real-time voice response for the visually impaired, comprising the following steps: providing an visual sensing module to sense an image containing at least an object, using a memory to store multiple training samples and multiple pieces of audio response information, using an image processing module to perform an image detection process to the image so as to detect the object, to segment and intercept the detected object from the image so as to create at least a segmented image, to track the segmented image, to perform an object detection process to the segmented image so as to extract an object characteristic of the segmented image, and to perform an object recognition process to the object characteristic so as to find a correspondence of the training samples stored in the memory and create a recognition signal, using a system processing module to perform a human machine interface, to receive the recognition signal and to find correspondence in the multiple pieces of audio response information stored in the memory based on the recognition signal so as to create an audio signal, and providing an audio module to output a speech voice hearable by a user based on the audio signal. Thereby, the guide system responds to road conditions in real time using the image processing module and the system processing module performing image processing and voice responses, respectively.

In one embodiment, the method further comprises providing an input module, through which the user inputs a command, such that the audio module is controlled by the system processing module.

In one embodiment, the method further comprises using a register to store the segmented image in a $(t-1)^{th}$ intercepted frame, wherein the image processing module receives the segmented image in a $t^{th}$ intercepted frame with finding the segmented image in the $(t-1)^{th}$ intercepted frame stored in the register so as to be calculated and compared, after which the segmented image in the $t^{th}$ intercepted frame is stored in the register.

In one embodiment, a computational theory of edge detection, called Canny algorithm, and a connected-component labeling method are used to perform the image detection process and to analyze and calculate the image so as to create the segmented image.

In one embodiment, the image processing module comprises a weak classifier and a strong classifier to analyze and calculate the segmented image in the object recognition process, wherein the weak classifier analyzes and calculates a signal of the segmented image using Adaboost's algorithm so as to create a profile signal, and wherein the strong classifier performs an image analysis process to the profile signal using a histogram of oriented gradients so as to create the recognition signal.

In one embodiment, the image processing module classifies the segmented image using a support vector machine (SVM) so as to find correspondence in the training samples stored in the memory.

In one embodiment, the audio module has the audio signal digital/analog converted using an adaptive differential pulse-code modulation (ADPCM) so as to create the speech voice.

Accordingly, in accordance with the present invention, the guide system having a function of a real-time voice response for the visually impaired and the method thereof have the following advantages:

(1) The guide system having a function of a real-time voice response for the visually impaired and the method thereof performs image processing and voice responses, respectively using a multi-core processor. Thereby, the traditional problem of a time delay due to processing image information and audio information in sequence using a traditional single-core processor can be improved such that responding environmental conditions in real time can be achieved.

(2) The guide system having a function of a real-time voice response for the visually impaired and the method thereof can be applied to an embedded operation platform so as to have a low power consumption, small volume, low cost and high performance.

The accompanying drawings are included to provide a further understanding of the invention, and are incorporated as a part of this specification. The drawings illustrate embodiments of the invention and, together with the description, serve to explain the principles of the invention.

DETAILED DESCRIPTION

Illustrative embodiments accompanying with figures are now described below to lead the characteristics, contents, advantages and effects of the invention to be understood by the Examiner. Figures are illustrated only for explanation, but are not drawn to scale and precise arrangement, and thus the scope of the invention should not be limited by the scale and arrangement illustrated in the figures.

The present invention is directed to a guide system having a function of a real-time voice response for the visually impaired and a method thereof. The guide system can detect an image of an environment and create a corresponding voice response using a multi-core processor so as to notify a user of environmental conditions in real time. The guide system is suitable for a guide-related device for the visually impaired, but is not limited in practice.

Following illustration accompanying with figures are embodiments for describing a guide system having a function of a real-time voice response for the visually impaired and a method thereof. In the following embodiments, similar elements are indicated by similar reference numbers.

Figure 1:
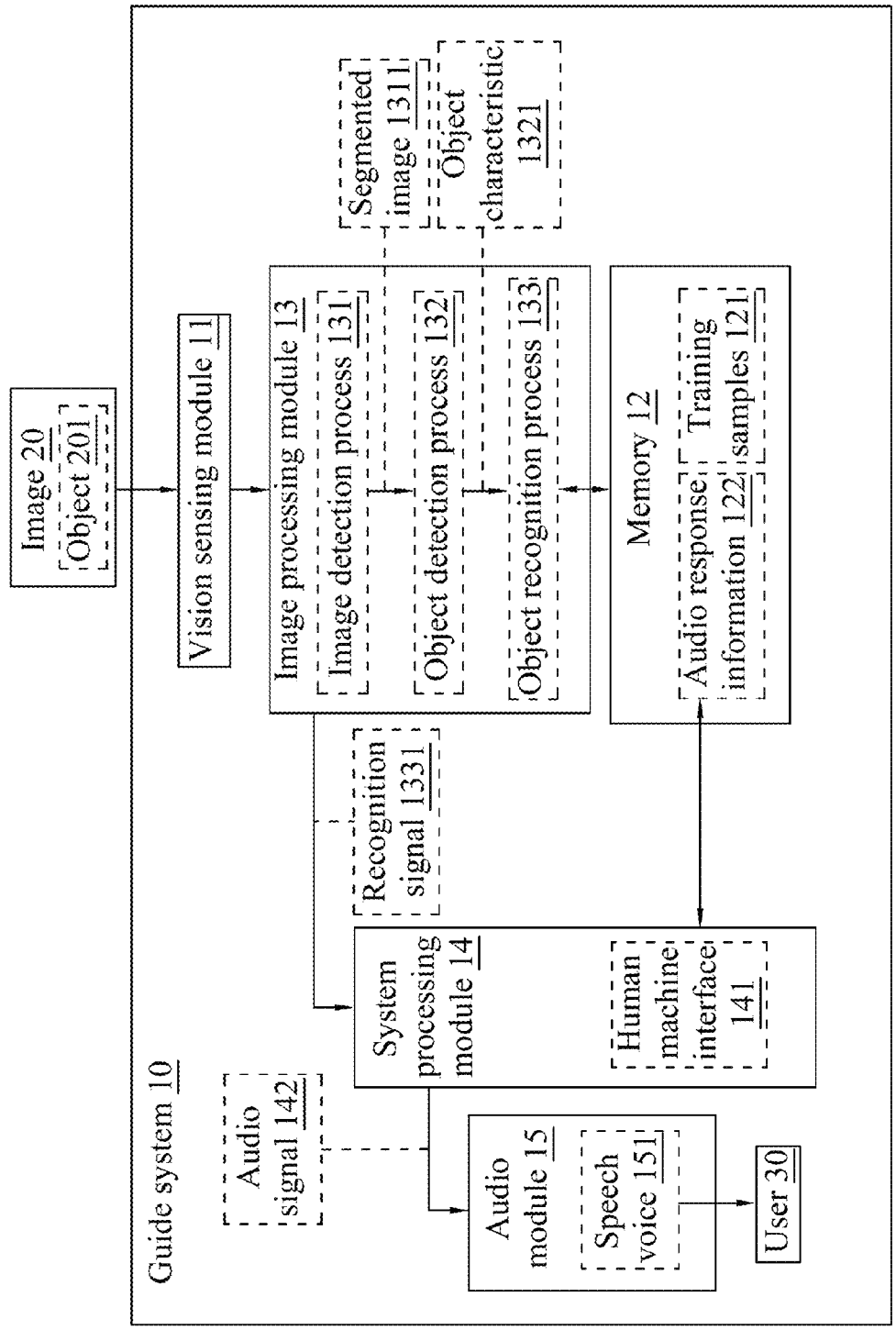
FIG. 1 is a block diagram of a guide system having a function of a real-time voice response for the visually impaired in accordance with the present invention.

FIG. 1 is a block diagram of a guide system having a function of a real-time voice response for the visually impaired in accordance with the present invention. Referring to FIG. 1, a guide system 10 having a function of a real-time voice response for the visually impaired contains a visual sensing module 11, a memory 12, an image processing module 13, a system processing module 14 and an audio module 15. The visual sensing module 11 senses an image 20, the image 20 contains at least one object, wherein the visual sensing module 11 can be a charge-coupled device (CCD) or complementary metal-oxide-semiconductor (CMOS) device. The memory 12 stores multiple training samples 121 and multiple pieces of audio response information 122. The image processing module 13, such as digital signal processor (DSP), performs an image detection process 131 to the image 20 so as to detect the object 201, segments and intercepts the detected object 201 from the image 20 so as to create at least a segmented image 1311, tracks the segmented image 1311, performs an object detection process 132 to the segmented image 1311 so as to extract an object characteristic 1321 of the segmented image 1311, and performs an object recognition process 133 to the object characteristic 1321 so as to find a correspondence of the training samples 121 stored in the memory 12 and create a recognition signal 1331. The system processing module 14, which can be a processor having a structure of an advanced RISC machine (ARM), such as ARMv7 or ARMv8, performs a human machine interface 141, receives the recognition signal 1331 and finds a correspondence of the multiple pieces of audio response information 122 stored in the memory 12 based on the recognition signal 1331 so as to create an audio signal 142. The audio module 15 outputs a speech voice 151 hearable by a user 30 based on the audio signal 142. Thereby, the image processing and voice responses can be processed using the image processing module 13 and the system processing module 14, respectively such that the speech voice 151 can be generated in real time by the audio module 15. Besides, additional memory can be added to memory 12 such that the image processing module 13 and the system processing module 14 can use different memories 12, respectively. Thereby, operation performance can be enhanced.

Figure 2:
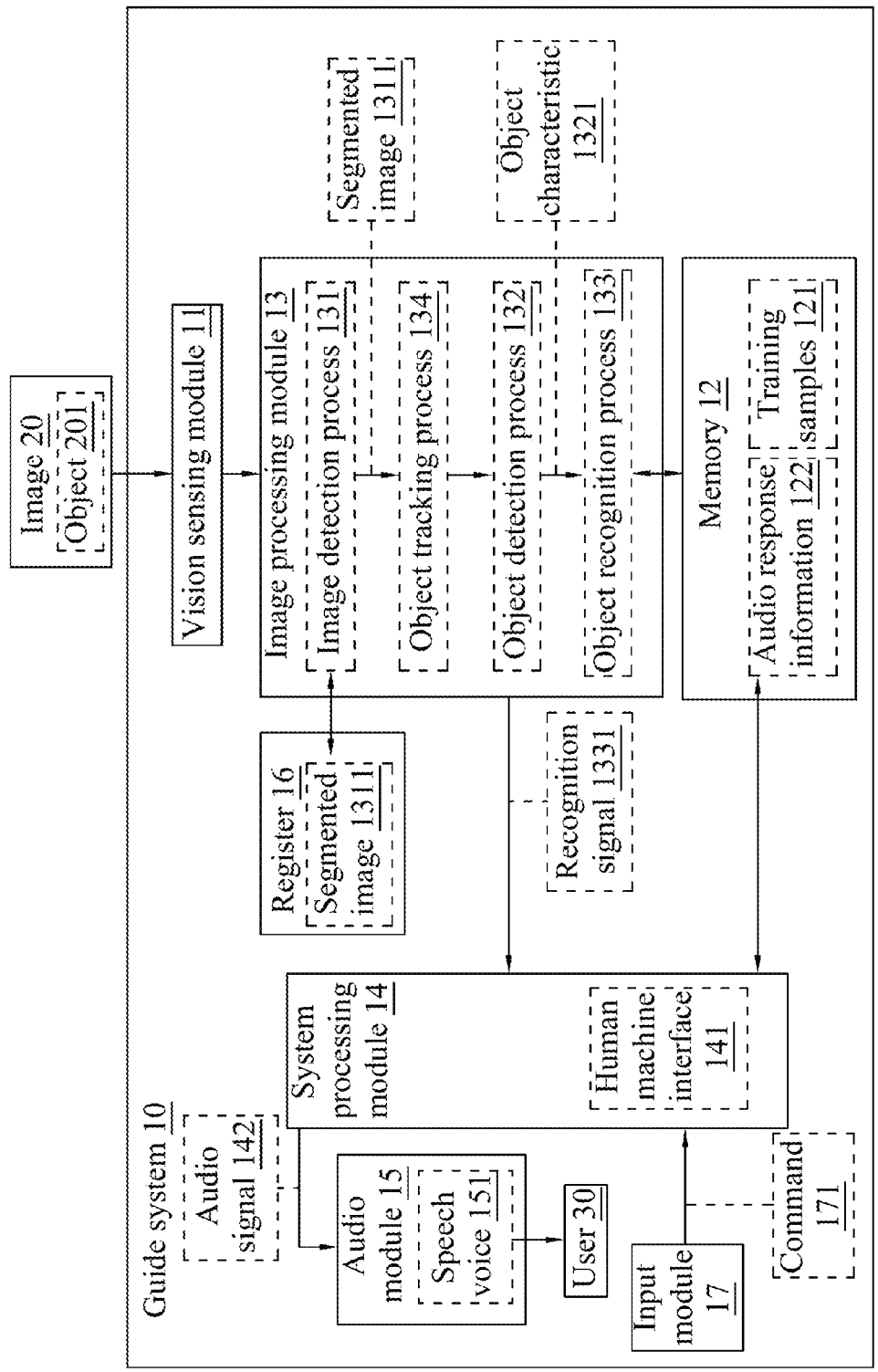
FIG. 2 is a first schematic view of a guide system having a function of a real-time voice response for the visually impaired in accordance with a first embodiment of the present invention.

FIG. 2 is a first schematic view of a guide system having a function of a real-time voice response for the visually impaired in accordance with a first embodiment of the present invention. Referring to FIG. 2, the guide system 10 having a function of a real-time voice response for the visually impaired contains the visual sensing module 11, the memory 12, the image processing module 13, the system processing module 14 the audio module 15, the register 16 and the input module 17. The action and connection relation thereof are similar to the above mentioned, and the similar description is not repeated herein.

After the visual sensing module 11 senses the image 20, the image 20 can be converted to an image signal that is transmitted to the image processing module 13. After receiving the image signal, the image processing module 13 performs the image detection process 131 to the image 20 and analyzes and processes the object 201 of the image 20 so as to create the segmented image 1311. The segmented image 1311 corresponding to the object 201 of the image 20 is transmitted to a register 16. The register 16 stores the segmented image 1311 in a $(t-1)^{th}$ intercepted frame. After receiving the segmented image 1311 in a $t^{th}$ intercepted frame, the image processing module 13 reads the segmented image in the $(t-1)^{th}$ intercepted frame stored in the register and compares them so as to recognize that the object 201 corresponding to the segmented image 1311 exists in the image 20, and the process is called an object tracking process 134. After the object tracking process 134 to the segmented image 1311 is performed to recognize the existence of the corresponding object 201, the image processing module 13 performs the object detection process 132 to the segmented image 1311 so as to extract the object characteristic 1321 of the segmented image 1311. The image processing module 13 performs the object recognition process 133 to the object characteristic 1321 and compares the object characteristic 1321 and the training samples 121 stored in the memory 12 so as to create the recognition signal 1331 that is transmitted to the system processing module 14. The training samples 121 can be periodically updated using a wireless transmission module. The system processing module 14 performs the human machine interface 141 and compares the received recognition signal 1331 and the audio response information 122 stored in the memory 12 so as to create an audio signal 142. After receiving the audio signal 142, the audio module 15 convert the audio signal 142 into the speech voice 151 hearable by the user 30. The audio module 15 uses an encoding and decoding technology of an adaptive differential pulse-code modulation (ADPCM). The audio module 15 can be connected to a wireless headphone for the convenience of the user 30. The user 30 can input a command 171 through an input module 17 so as to control the guide system 10, such as turning up or down the volume of a voice response or switching power on or off. The input module 17 can be designed to be used by voice controlling for the convenience of the user 30.

Figure 3:
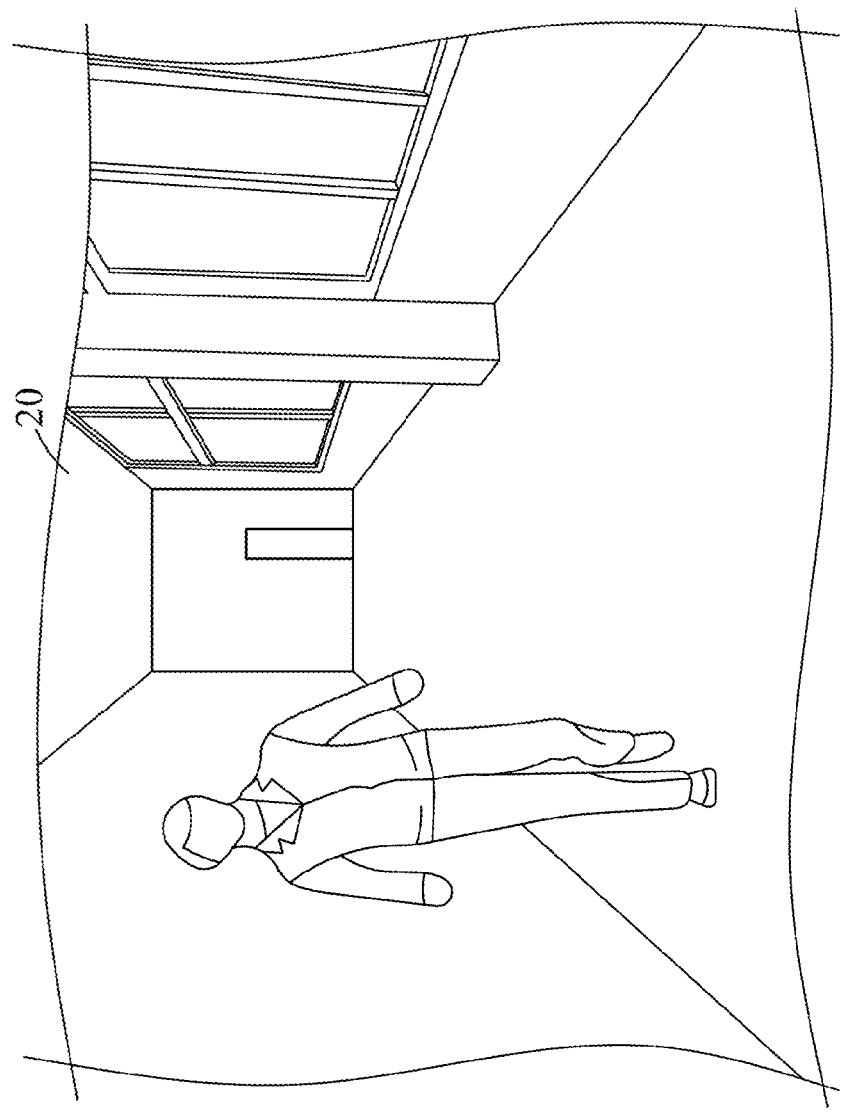
FIG. 3 is a second schematic view of a guide system having a function of a real-time voice response for the visually impaired in accordance with a first embodiment of the present invention.
Figure 4:
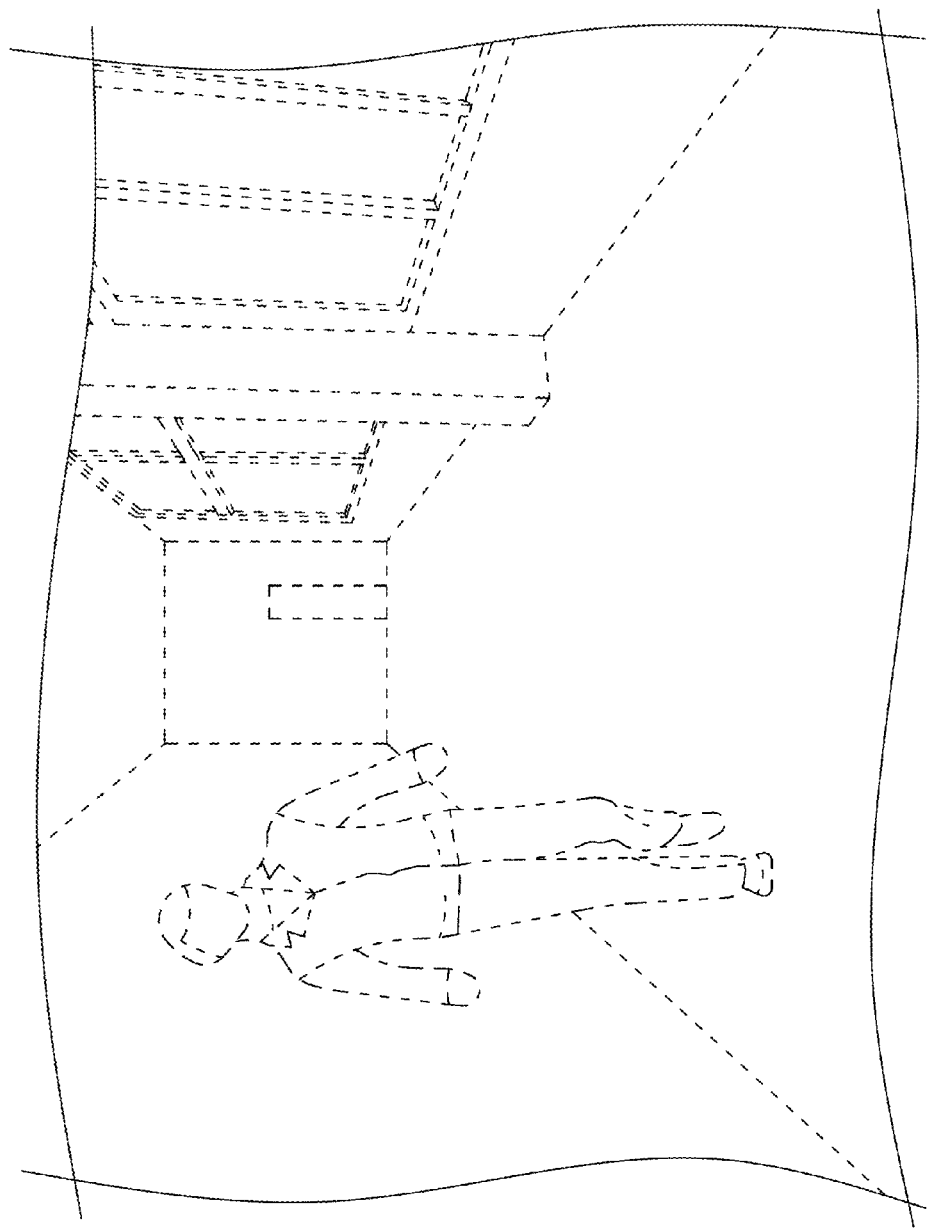
FIG. 4 is a third schematic view of a guide system having a function of a real-time voice response for the visually impaired in accordance with a first embodiment of the present invention.
Figure 5:
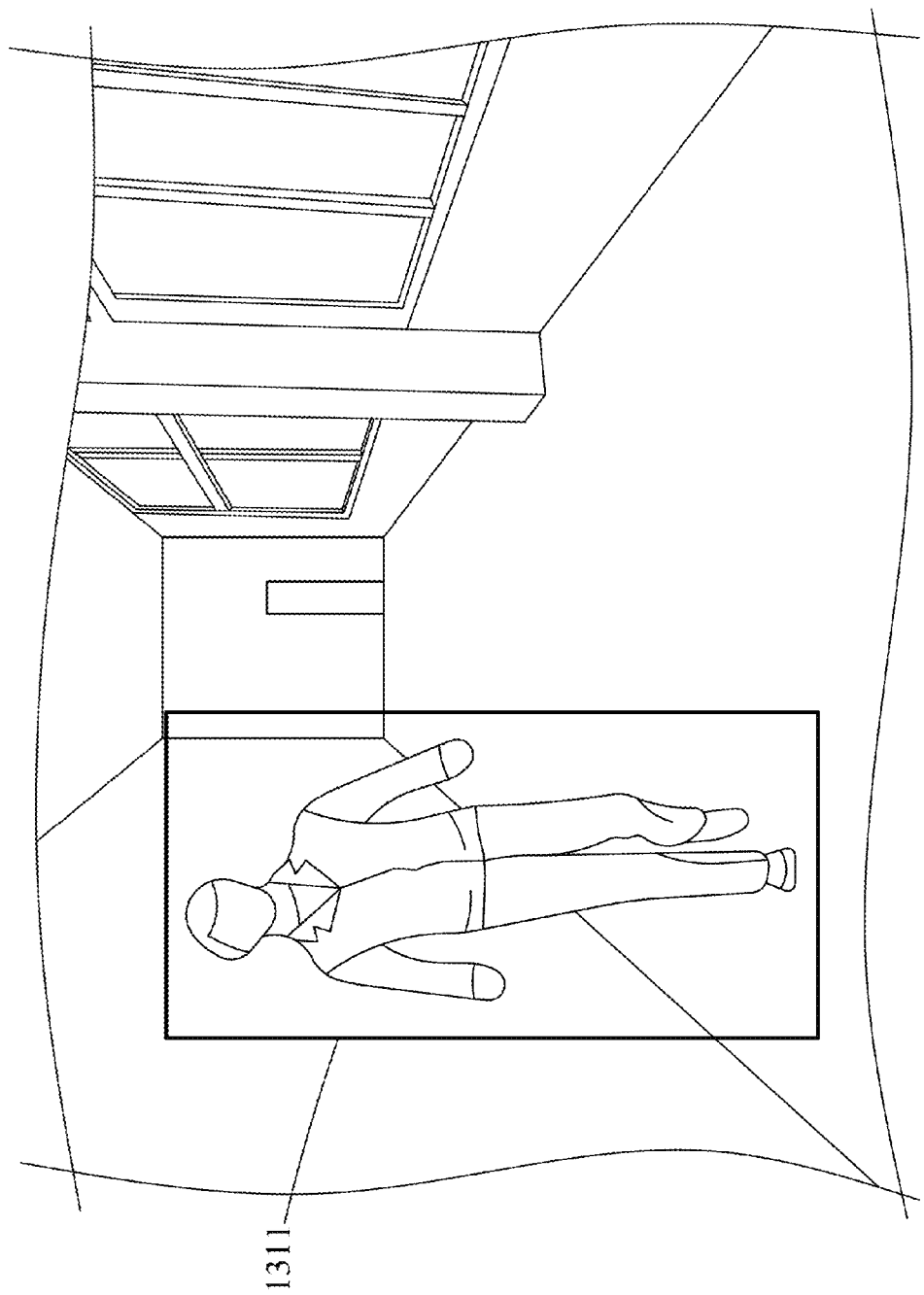
FIG. 5 is a fourth schematic view of a guide system having a function of a real-time voice response for the visually impaired in accordance with a first embodiment of the present invention.

FIG. 3 is a second schematic view of a guide system having a function of a real-time voice response for the visually impaired in accordance with a first embodiment of the present invention. FIG. 4 is a third schematic view of a guide system having a function of a real-time voice response for the visually impaired in accordance with a first embodiment of the present invention. FIG. 5 is a fourth schematic view of a guide system having a function of a real-time voice response for the visually impaired in accordance with a first embodiment of the present invention. Referring to FIGS. 3, 4 and 5, a computational theory of edge detection, called Canny algorithm, is used to perform the image detection process 131 to the image 20 shown in FIG. 3 so as to create an edge detection image shown in FIG. 4. A connected-component labeling method is then performed to form the segmented image 1311 shown in FIG. 5. The image detection process 131 is performed first by an edge detection process to the image 20 using the Canny algorithm. After the image detection process 131, an maximum area is intercepted on the object 201 using the connected-component labeling method so as to create the segmented image 1311. The connected-component labeling method is a scanning method, including a coarse scanning method and a refined scanning method, to label all connected-component blocks on a binary image transformed after being segmented. In the coarse scanning method, a connection element may be divided into multiple portions, and equivalent labels are added to the recognized connection elements. Next, the refined scanning method is performed to the equivalent labels to decide labels of connected components. The object tracking process 134 has a main concept that an object has a smooth moving track in continuous images, and thus a moving direction and moving velocity thereof reflect some degree of smoothness. Moving tracks of each targeted objects in each frames can be calculated and obtained using an algorithm of minimizing a path coherence function. Thereby, the information of moving directions, positions, velocities and so on for each targeted objects appearing in monitored frames in each time points can be calculated so as to recognize if the object 201 corresponding to the segmented image 1311 exists in the image 20.

The object detection process 132 and the object recognition process 133 can be performed using a weak classifier and a strong classifier so as to shorten detection time and provide high detection accuracy. The object detection process 132 is performed to extract the object characteristic using Haar-like characteristic and then the object characteristic is passed to an AdaBoost weak classifier and a cascade classifier for training the object characteristic. The object recognition process 133 is performed to extract the object characteristic using a histogram of oriented gradients and then the object characteristic is passed to a classifier of a supported vector machine for training the object characteristic such that a strong classifier with relatively high accuracy can be trained. The supported vector machine has a principle similar to a neural network often having a purpose of classification. In case of which framework characteristic is preset to correspond to a person, after a dynamic framework characteristic is obtained, a classification process can be performed to recognize if the obtained framework characteristic of an irregularly shaped object is a person. In brief, the weak classifier analyzes the segmented image 1311 so as to create a profile signal, and the strong classifier performs an image analysis process to the profile signal using a histogram of oriented gradients so as to create the recognition signal 1331.

Figure 6:
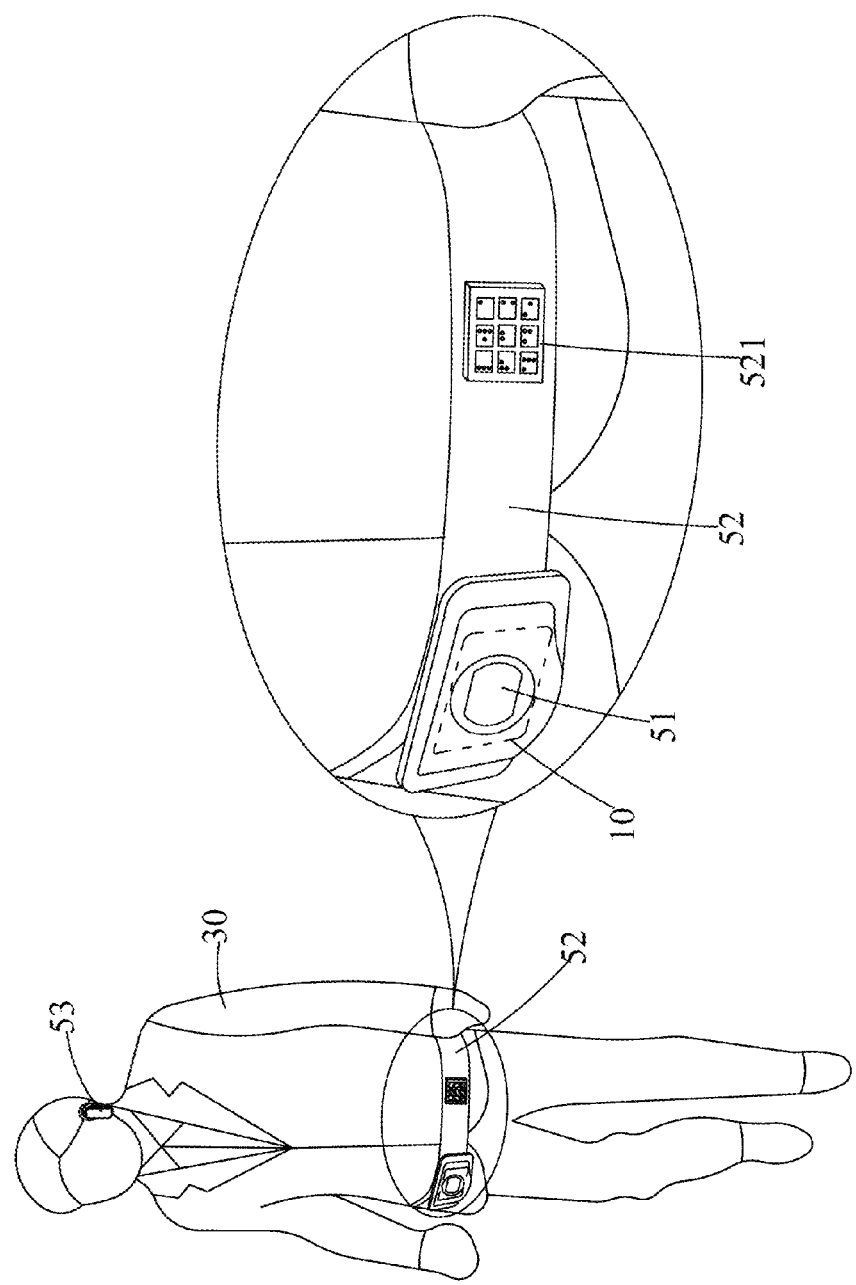
FIG. 6 is a schematic view of a guide system having a function of a real-time voice response for the visually impaired in accordance with a second embodiment of the present invention.

FIG. 6 is a schematic view of a guide system having a function of a real-time voice response for the visually impaired in accordance with a second embodiment of the present invention. Referring to FIG. 6, a guide system 10 having a function of a real-time voice response for the visually impaired contains a micro image-capturing device 51, a waist band 52, a headphone 53, the visual sensing module 11, the memory 12, the image processing module 13, the system processing module 14, the audio module 15, the register 16 and the input module 17, wherein each modules are embedded into a substrate so as to form an embedded system. The interaction between the modules is described as above, and the similar description is not repeated herein. The micro image-capturing device 51 performs an image capturing process operating in coordination with the visual sensing module 11. After the visual sensing module 11 senses the image 20, the image processing module 13 is used to perform the image detection process 131, the object tracking process 134, the object detection process 132 and the object recognition process 133 so as to create the recognition signal 1331. After receiving the recognition signal 1331, the system processing module 14 performs a digital/analog signal conversion so as to output the speech voice 151. The user 30 can connect a control interface 521 on the waist band 52 to the input module 17 and thereby switch power on or off or turn volume up or down for the guide device 10. The audio module 15 may have wireless or wired connection to the headphone 53.

Figure 7:
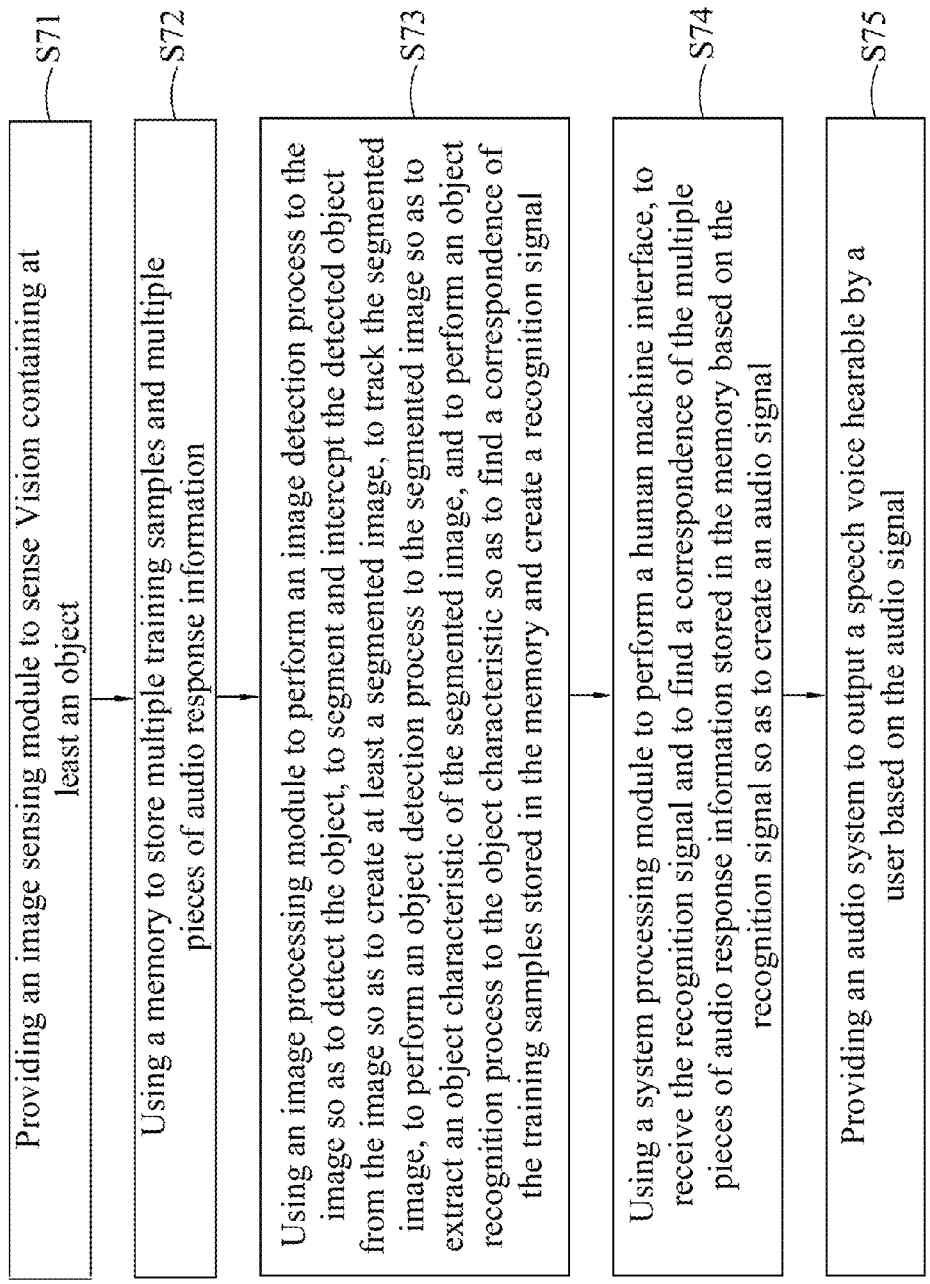
FIG. 7 is a flow chart of a real-time voice response method in accordance with the present invention.

FIG. 7 is a flow chart of a real-time voice response method in accordance with the present invention. The real-time voice response method for the guide system 10 having a function of a real-time voice response for the visually impaired includes the following steps:

Step S71: providing an visual sensing module to sense an image containing at least an object;

Step S72: using a memory to store multiple training samples and multiple pieces of audio response information;

Step S73: using an image processing module to perform an image detection process to the image so as to detect the object, to segment and intercept the detected object from the image so as to create at least a segmented image, to track the segmented image, to perform an object detection process to the segmented image so as to extract an object characteristic of the segmented image, and to perform an object recognition process to the object characteristic so as to find a correspondence of the training samples stored in the memory and create a recognition signal;

Step S74: using a system processing module to perform a human machine interface, to receive the recognition signal and to find a correspondence of the multiple pieces of audio response information stored in the memory based on the recognition signal so as to create an audio signal; and Step S75: providing an audio module to output a speech voice hearable by a user based on the audio signal.

Thereby, the image processing and voice responses can be processed using the image processing module and the system processing module, respectively such that the speech voice can be generated in real time by the audio module.

The embodiment of the method is described in paragraphs explaining the guide system having a function of a real-time voice response for the visually impaired, and the similar description is not repeated herein.

What is claimed is:

1. A guide system having a function of a real-time voice response for the visually impaired, comprising:

a visual sensing module sensing an image containing at least an object;

a memory storing multiple training samples and multiple pieces of audio response information;

an image processing module performing an image detection process to the image so as to detect the object, segmenting and intercepting the detected object from the image so as to create at least a segmented image, tracking the segmented image, performing an object detection process to the segmented image so as to extract an object characteristic of the segmented image, and performing an object recognition process to the object characteristic so as to find correspondence in the training samples stored in the memory and create a recognition signal;

a system processing module performing a human machine interface, receiving the recognition signal and finding correspondence in the multiple pieces of audio response information stored in the memory based on the recognition signal so as to create an audio signal; and an audio module outputting a speech voice hearable by a user based on the audio signal, wherein the guide system responds to road conditions in real time using the image processing module and the system processing module performing image processing and voice responses, respectively.

2. The guide system of claim 1 further comprising an input module, through which the user inputs a command, such that the audio module is controlled by the system processing module.

3. The guide system of claim 1 further comprising a register storing the segmented image in a $(t-1)^{th}$ intercepted frame, wherein the image processing module receives the segmented image in a $t^{th}$ intercepted frame with finding the segmented image in the $(t-1)^{th}$ intercepted frame stored in the register so as to be calculated and compared, after which the segmented image in the $t^{th}$ intercepted frame is stored in the register.

4. The guide system of claim 1, wherein a computational theory of edge detection, called Canny algorithm, and a connected-component labeling method are used to perform the image detection process and to analyze and calculate the image so as to create the segmented image.

5. The guide system of claim 1, wherein the image processing module comprises a weak classifier and a strong classifier to analyze and calculate the segmented image in the object recognition process, wherein the weak classifier analyzes and calculates a signal of the segmented image using Adaboost's algorithm so as to create a profile signal, and wherein the strong classifier performs an image analysis process to the profile signal using a histogram of oriented gradients so as to create the recognition signal.

6. The guide system of claim 1, wherein the image processing module classifies the segmented image using a support vector machine (SVM) so as to find correspondence in the training samples stored in the memory.

7. The guide system of claim 1, wherein the audio module has the audio signal digital/analog converted using an adaptive differential pulse-code modulation (ADPCM) so as to create the speech voice.

8. A real-time voice response method for a guide system having a function of a real-time voice response for the visually impaired, comprising:

providing a visual sensing module to sense an image containing at least an object;

using a memory to store multiple training samples and multiple pieces of audio response information;

using an image processing module to perform an image detection process to the image so as to detect the object, to segment and intercept the detected object from the image so as to create at least a segmented image, to track the segmented image, to perform an object detection process to the segmented image so as to extract an object characteristic of the segmented image, and to perform an object recognition process to the object characteristic so as to find correspondence in the training samples stored in the memory and create a recognition signal;

using a system processing module to perform a human machine interface, to receive the recognition signal and to find correspondence in the multiple pieces of audio response information stored in the memory based on the recognition signal so as to create an audio signal; and providing an audio module to output a speech voice hearable by a user based on the audio signal, wherein the guide system responds to road conditions in real time using the image processing module and the system processing module performing image processing and voice responses, respectively.

9. The method of claim 8 further comprising providing an input module, through which the user inputs a command, such that the audio module is controlled by the system processing module.

10. The method of claim 8 further comprising using a register to store the segmented image in a $(t-1)^{th}$ intercepted frame, wherein the image processing module receives the segmented image in a $t^{th}$ intercepted frame with finding the segmented image in the $(t-1)^{th}$ intercepted frame stored in the register so as to be calculated and compared, after which the segmented image in the $t^{th}$ intercepted frame is stored in the register.

11. The method of claim 8, wherein a computational theory of edge detection, called Canny algorithm, and a connected-component labeling method are used to perform the image detection process and to analyze and calculate the image so as to create the segmented image.

12. The method of claim 8, wherein the image processing module comprises a weak classifier and a strong classifier to analyze and calculate the segmented image in the object recognition process, wherein the weak classifier analyzes and calculates a signal of the segmented image using Adaboost's algorithm so as to create a profile signal, and wherein the strong classifier performs an image analysis process to the profile signal using a histogram of oriented gradients so as to create the recognition signal.

13. The method of claim 8, wherein the image processing module classifies the segmented image using a support vector machine (SVM) so as to find correspondence in the training samples stored in the memory.

14. The method of claim 8, wherein the audio module has the audio signal digital/analog converted using an adaptive differential pulse-code modulation (ADPCM) so as to create the speech voice.

* * * * *